(12) United States Patent
Laabs et al.

(10) Patent No.: US 6,508,092 B1
(45) Date of Patent: Jan. 21, 2003

(54) SNAP-IN MOUNT FOR CAM LOCKS AND THE LIKE

(75) Inventors: Timothy P. Laabs, Palatine, IL (US); Michael O. Misner, Lake Villa, IL (US); John J. Crocco, Gurnee, IL (US)

(73) Assignee: The Eastern Company, Wheeling, IL (US)

(*) Notice: Subject to any disclaimer, the term of this patent is extended or adjusted under 35 U.S.C. 154(b) by 0 days.

(21) Appl. No.: 09/768,866

(22) Filed: Jan. 24, 2001

(51) Int. Cl.[7] .............................................. E05B 9/08
(52) U.S. Cl. ............................ 70/370; 70/451; 24/297; 248/222.11; 248/222.12; 403/317; 403/329; 411/510
(58) Field of Search ........................ 70/370, 451, 466; 248/222.11, 222.12; 411/508, 509, 510, 913; 403/326, 329, 317, 316; 24/297, 662

(56) References Cited

U.S. PATENT DOCUMENTS

| | | | |
|---|---|---|---|
| 719,684 A | 2/1903 | Moore | |
| 1,400,155 A | * 12/1921 | Greenburg | 70/370 |
| 1,470,858 A | * 10/1923 | Maxwell | 70/370 |
| 1,561,254 A | * 11/1925 | Ledin | 70/370 |
| 2,093,038 A | * 9/1937 | Douglas | 70/370 |
| 2,140,441 A | * 12/1938 | Clark | 70/370 |
| 2,244,976 A | * 6/1941 | Tinnerman | 70/370 |
| 2,424,757 A | 7/1947 | Klumpp, Jr. | 174/153 |
| 2,558,852 A | * 7/1951 | Jacobi | 70/451 |
| 2,580,548 A | * 1/1952 | Jacobi | 70/370 |
| 2,629,248 A | * 2/1953 | Burdick | 70/370 |
| 2,633,011 A | * 3/1953 | Poupitch | 70/370 |
| 2,745,275 A | * 5/1956 | Jacobi | 70/370 |
| 3,079,581 A | 2/1963 | Klumpp, Jr. | 339/128 |
| 3,190,092 A | * 6/1965 | Patriquin | 70/370 |
| 3,425,729 A | 2/1969 | Bisbing | 292/251.5 |
| 3,503,233 A | * 3/1970 | Russell et al. | 70/370 |
| 3,604,230 A | * 9/1971 | Tixier | 70/370 X |
| 4,080,522 A | 3/1978 | Schimmels | 200/295 |
| 4,363,230 A | 12/1982 | Lipschutz | 70/370 |
| 4,586,354 A | * 5/1986 | Smith | 70/370 X |
| 4,910,982 A | 3/1990 | Dana | 70/370 |
| 4,951,980 A | * 8/1990 | Wetzel | 70/451 X |
| 5,249,443 A | 10/1993 | Anderson | 70/370 |
| 5,251,467 A | 10/1993 | Anderson | 70/370 |
| 5,435,159 A | * 7/1995 | Ramsauer | 70/370 |
| 5,479,800 A | 1/1996 | Myers | 70/365 |
| 5,669,731 A | 9/1997 | Hironaka et al. | 403/405.1 |
| 6,161,404 A | * 12/2000 | Westwinkel | 70/370 |

FOREIGN PATENT DOCUMENTS

| | | | | |
|---|---|---|---|---|
| CH | 396681 | * | 1/1966 | 70/451 |
| DE | 4006706 | * | 9/1991 | 70/370 |
| EP | 0221375 | * | 5/1987 | 70/370 |

* cited by examiner

Primary Examiner—Lloyd A. Gall
(74) Attorney, Agent, or Firm—David A. Burge

(57) ABSTRACT

A generally cylindrical body of a device such as a cam lock is provided with a snap-in mount that enables the body to be mounted from one side of and through mounting holes formed in support panels of distinctly different thicknesses. The body has a shoulder that faces in one direction toward one side of a support panel, and carries sets of movable arms that define engagement surfaces located at different distances from the shoulder that snap outwardly after being inserted through a panel mounting hole to face toward the opposite side of the support panel. The body can be mounted on panels having three different thicknesses if three sets of arms are provided that each define engagement surfaces located at a different distance from the shoulder. More panel thicknesses can be accommodated if one or more of the sets of arms define two or more sets of engagement surfaces each located at a distinctly different distance from the shoulder.

30 Claims, 3 Drawing Sheets

SNAP-IN MOUNT FOR CAM LOCKS AND THE LIKE

REFERENCE TO SUBJECT-MATTER-RELATED DESIGN APPLICATION

Reference is made to design application Ser. No. 29/136,082 filed Jan. 24, 2001 by Timothy P. Laabs et al entitled HOUSING PORTIONS OF A CAM LOCK which discloses appearance features that may be utilized in practicing the present invention, the disclosure of which is incorporated herein by reference.

BACKGROUND OF THE INVENTION

1. Field of the Invention

The present invention relates to a snap-in mount for mounting a generally cylindrical body of a device such as a cam lock in holes formed through support panels that differ in thickness. More particularly, the present invention relates to a generally cylindrical body of a cam lock or the like that defines a shoulder for facing toward and engaging one side of a support panel, and that defines an insertion portion which extends away from the shoulder and is configured to be moved along an axis of and inserted through a panel mounting hole, with a plurality of arms being connected to the body for defining arm portions that spring radially outwardly from the insertion portion after the insertion portion hats been inserted through the hole to provide engagement surfaces for engaging the opposite side of the panel, with the engagement surfaces being located at differing distances from a plane in which the shoulder engages the one side of the support panel so that the body can be securely mounted on panels having thicknesses that substantially equal one of these differing distances.

2. Prior Art

Snap-in mounting arrangements for installing small devices such as latches, locks, indicator lights, electrical switches and the like in holes formed through support panels are well known. Often the device to be installed has a generally cylindrical body with a bezel or other type of body formation that defines a shoulder for facing toward and engaging one side of a support panel, with the opposite side of the support panel being engaged by elements that are movably carried by the body and biased to snap radially outwardly after being inserted at least part way through a support panel hole.

Some previously proposed snap-in mounts employ a pair of opposed, radially outwardly biased elements such as arms that are formed integrally with a body that is molded from plastics material, wherein the arms take advantage of the so-called "memory" of the plastics material to provide a biasing action that is sufficient to snap the arms radially outwardly (after the arms have passed at least part way through a mounting hole formed in a support panel during installation of the body on the support panel), whereafter the arms are retained by the "memory" of the material in their outwardly extended positions where they engage the rear face of the support panel. These "snap-out" elements typically are connected to other portions of the body by regions of relatively thin cross-section that can be flexed to permit the elements to move radially inwardly a sufficient amount to permit passage through a mounting hole. Since the thin cross-sections normally are flexed only once (or only a very limited number of times) during installation of the body on a support panel, the flexed cross-sections usually do not break, and usually retain sufficient strength to be capable of retaining the snap-out elements in their radially outwardly extended positions for holding their associated devices in installed positions on support panels throughout relatively lengthy service lives.

In an effort to accommodate support panels of slightly differing thicknesses, it also is known to provide each of the snap-out elements (of the snap-in mounts of devices to be installed in mounting holes formed through the support panels) with a rack of small tooth-like formations. The tooth-like formations do not feature a design that is optimized for use with a particular panel thickness; rather, these formations are intended to grip, as best they can, support panels within a narrow range of thicknesses, typically to accommodate a range of tolerances such as may be needed if support panels intended to be of generally the same thickness are being provided by a plurality of suppliers. Thus, one drawback associated with utilizing sets of small tooth-like formations on the snap-out elements of a snap-in mount is the fact that the "teeth" do not feature a design that is optimized to work with any particular support panel thickness. A further drawback resides in the fact that the range of panel thicknesses that the tooth formations are designed to serve usually is quite limited, whereby panel thicknesses that vary significantly one from another are not well accommodated by this approach.

A further limitation that results from utilizing sets or racks of small tooth-like formations on the snap-out elements of snap-in mounts is that the small size of the teeth, and the fact that relatively few of the teeth actually grip a support panel, can cause the resulting grip of the device on the support panel to be lacking in "meat." Weak grips provided by small teeth can loosen with time as the plastic material from which the teeth are formed tends to wear away, with sharp edges that may enhance the grip tending to "round off" so as to conform better to the shape of the panel that is being gripped by the teeth. The resulting relatively weak grips often can be defeated by force, which can permit security devices such as cam locks and switch locks to be pulled from their mounting positions so that the functions they serve can be defeated or bypassed.

Still another problem often not well addressed by the snap-in mounts of prior proposals is the fact that inexpensively formed mounting holes formed in support panels of lockable thermostat covers (and other kinds of low-security equipment covers and the like) can vary significantly in size, which may cause the bodies of devices installed in these holes to fit quite loosely. Undesirable movements and rattling noise may result during use, especially in the presence of vibration. The use of only one pair of oppositely biased snap-out elements that engage only small regions of a support panel at locations on opposite sides of a mounting hole may serve to limit body movement in the opposite directions (that reside within a plane that includes the opposite directions) in which the elements are biased, but tends to do little to limit vibratory movements of the body in other directions (i.e., in directions that are transverse to the plane that contains the opposite directions in which the snap-out elements are biased by the "memory" of the plastics material from which these elements are formed). While some proposals call for the use of auxiliary biasing devices such as springs to intensify the biasing action in an effort to minimize vibration, the fact that the resulting biasing action operates only in a single plane (namely the plane that contains the opposite directions of the biasing action of the oppositely biased pair of snap-out elements) still does little to quell body movements in directions that are transverse thereto.

SUMMARY OF THE INVENTION

The present invention addresses the foregoing and other needs and drawbacks by providing a snap-in mount for mounting a generally cylindrical body of a device such as a cam lock, a switch lock, an indicator light or the like in holes formed through support panels that differ in thickness. In one form of the invention, the body is configured to define a shoulder for facing toward and engaging one side of a support panel, and an insertion portion which extends away from the shoulder and is configured to be moved along an axis of and inserted through a panel mounting hole. A plurality of arms are connected to the body for defining arm portions that spring radially outwardly from the insertion portion after the insertion portion has been inserted through the hole to provide engagement surfaces for engaging the opposite side of the panel. The engagement surfaces are located at differing distances from a plane in which the shoulder engages the one side of the support panel so that the body can be securely mounted on panels having thicknesses that substantially equal one of these differing distances.

In another form of the invention, a snap-in mount is provided for a device that adapts a body of the device to be mounted from one side of and through a: hole formed in a support panel to secure the device to the panel. A shoulder of the device faces in one direction toward the panel for engaging the one side of the panel. A plurality of engagement surfaces also are defined by the device that face in an opposite direction for engaging an opposite side of the panel when the shoulder engages the one side of the panel, with distances between the engagement surfaces and a plane in which the shoulder engages the one side of the panel differing sufficiently to enable the device to be mounted on panels of distinctly different thicknesses. The body of the device has an insertion portion that is configured to be positioned and moved along an axis of the hole so as to be inserted through the hole from the one side of the panel to an installed position where the shoulder of the device faces toward and engages the one side of the panel. A plurality of sets of arms are connected to the body, with each of the arms having an arm portion that is movable inwardly toward the axis and outwardly away from the axis when the body is positioned along the axis. Each of the arm portions is configured, when moved inwardly toward the axis, to pass at least part way through the hole when the insertion portion of the body is moved along the axis to the installed position. Each of the arm portions is configured, when moved outwardly away from the axis, to define an engagement surface that faces in the one direction toward said plane. The engagement surfaces defined by the arm portions of one of the sets of arms are spaced a substantially equal distance from said plane that differs from another distance at which the engagement surfaces defined by the arm portions of at least one of the other sets of arms is spaced from said plane. The arms are connected to the body in a manner that causes the arm portions to normally extend outwardly from the insertion portion of the body to positions located away from the axis, and in a manner that causes the arm portions to be biased toward these extended positions when the arm portions are pressed inwardly toward the axis to permit the insertion portion of the body to pass through the hole so as to cause the arm portions of at least one of the sets of arms to move outwardly away from the axis once the insertion portion has been moved to the installed position to cause the engagement surfaces thereof to face in said opposite direction toward said opposite side of the panel so that the one and opposite sides of the panel are engaged by the shoulder and by selected ones of the engagement surfaces of such ones of the arm portions as have moved outwardly away from the axis after passing at least part way through the hole. By this arrangement, the device can be securely mounted on panels of differing thicknesses that each substantially equal one of the differing distances.

In another form of the invention, a cam lock has a body 1) that extends along an imaginary central axis, 2) that defines a shoulder which faces in one direction along the axis and extends in a shoulder plane that perpendicularly intersects the axis for engaging one side of a panel on which the cam lock is to be mounted, 3) that has a generally cylindrical insertion portion of the body that extends in said direction along the axis away from the shoulder and that is configured to be inserted into and to pass at least partially through a mounting hole formed through the panel, and 4) that carries arms arranged in opposed pairs on opposite sides of the axis with the arms of one of the pairs being spaced circumferentially about the body from the arms of others of the pairs. The arms define arm portions 1) that travel at least part of the way through the mounting hole when the insertion portion of the body is inserted into the mounting hole to an installed position of the body wherein the shoulder engages the one side of the panel, 2) that are movable radially inwardly and outwardly relative to the body, and 3) that are biased outwardly toward extended positions relative to the body, with the arm portions of each pair of arms being operative when in the extended positions thereof to define engagement surfaces that face in an opposite direction along the axis toward the shoulder plane for engaging an opposite side of the panel, and with the engagement surfaces of one of the pairs of arms extending in at least one plane that perpendicularly intersects the axis at at least one distance from the shoulder plane that differs from at least one other distance at which a plane in which the engagement surfaces of another of the pairs of arms perpendicularly intersects the axis, to thereby enable the engagement surfaces of the one and another pairs of arms to cooperate with the shoulder to grip panels of differing thicknesses when the body is in installed positions in mounting holes defined by said panels of differing thickness.

One novel feature of the present invention resides in the use it makes of a plurality of sets of body-carried snap-out elements to define engagement surfaces that extend in different planes spaced along a central axis of the body from a body-defined shoulder to accommodate support panels of distinctly different thicknesses that substantially equal the distances between the plane of the shoulder and the planes of the engagement surfaces. Other novel features also are present, as is exemplified by the use that may be made of a plurality of sets of outwardly biased snap-out elements to engage support panel material that surrounds mounting holes to minimize vibratory movements of the bodies that are installed in the holes.

BRIEF DESCRIPTION OF THE DRAWINGS

These and other features, and a fuller understanding of the invention may be had by referring to the following description and claims, taken in conjunction with the accompanying drawings, wherein:

Description of the Preferred Embodiment

While the drawings depict the snap-in mount of the present invention embodied in a so-called "cam lock," it will be understood that the snap-in mount of the present invention can be employed to install the generally cylindrical bodies of a variety of key-operated devices such as key-operated locks and key-operated electrical devices such as switches on support panels of a variety of thicknesses, and to install a variety of other kinds of devices such as indicator lights, microphones, speakers, non-key-operated switches and the like on support panels of a variety of thicknesses.

It also should be understood that the snap-in mount of the present invention is seldom well suited for use in so-called "high security" applications. A "low security" application for which the snap-in mount of the present invention is well suited is to hold closed such covers or guards as may be used to shield wall-mounted thermostats in public buildings where it is desirable to shield sensitive thermostat controls from being accidentally hit by building occupants, and to restrict access to to these controls to those who are authorized to adjust their settings. The snap-in mount of the present invention can be used in applications such as this to mount simple cam locks on "support panels" such as removable plastic thermostat covers to accomplish non-critical shielding and non-critical access control functions of this general nature.

Figure 1:
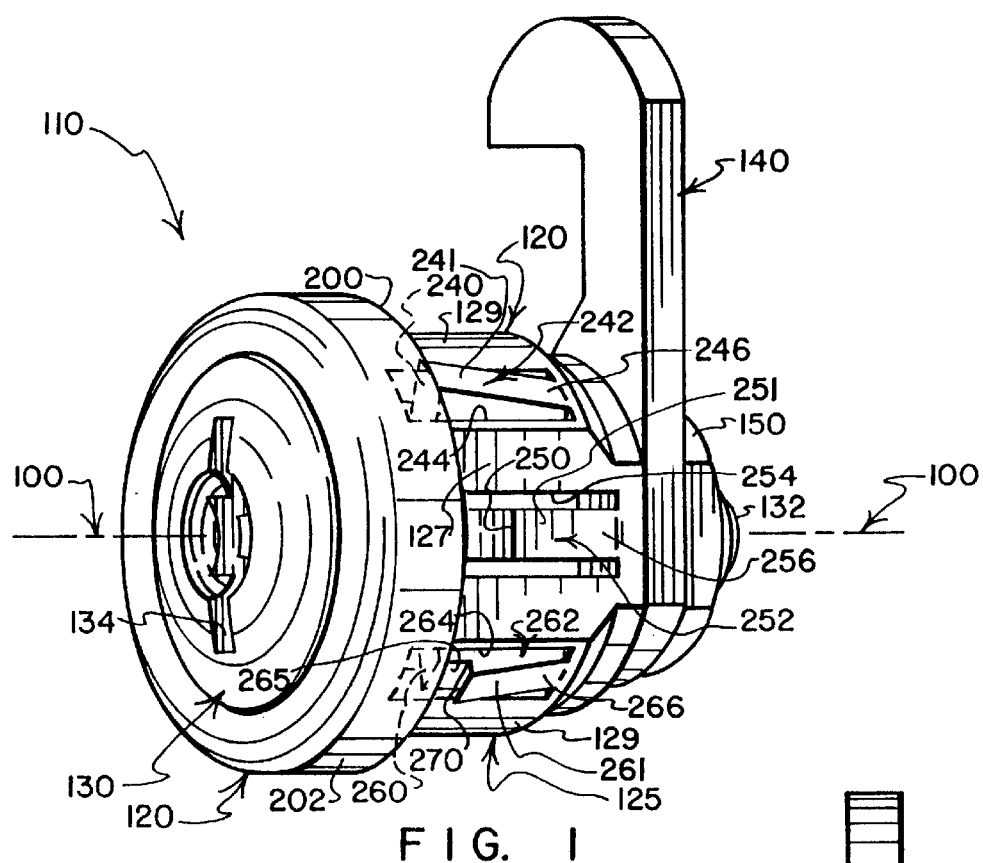
FIG. 1 is a perspective view of a cam lock having a body provided with a snap-in mount that enables the body to be installed in holes formed through support panels of a variety of thicknesses.
Figure 2:
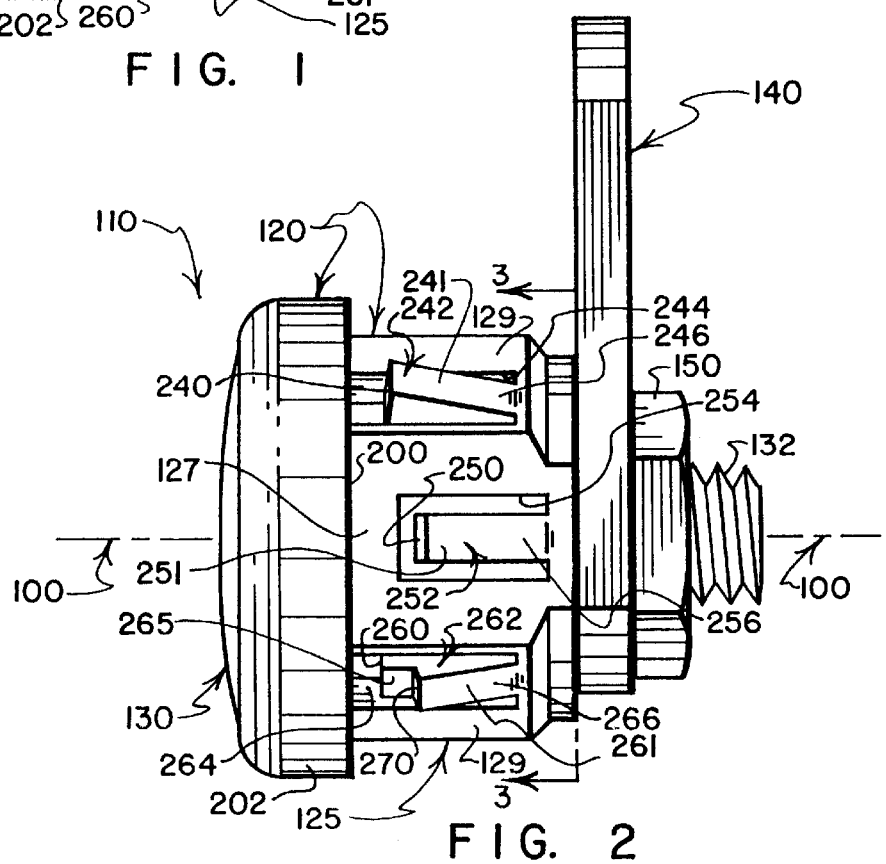
FIG. 2 is a right side elevational view thereof.

Turning now to FIGS. 1 and 2, a cam lock 110 is shown which has a body 120 that protectively encloses a key-operated plug 130. The plug 130 extends through the body 120 along a central axis 100. The plug 130 has a threaded rear region 132 which projects rearwardly from the body 120 to support a hook-shaped cam 140 and a lock-nut 150.

The cam lock 110 operates in a manner that is well known to those who are skilled in the art in that, after the body 120 has been suitably mounted in a hole (such as one of the mounting holes 111, 112, 113, 114 that are formed through the panels 101, 102, 103, 104, as is depicted in FIGS. 4, 5, 6, 7, respectively), a suitably configured key (not shown) can be inserted into a key slot 134 (see FIG. 1) defined by the plug 130 to permit the plug 130 to be rotated about the axis 100 to move the hook-shaped cam 140 about the axis 100 between locked and unlocked positions wherein the cam 140 engages and disengages other suitably configured structure (not shown). To keep the plug 130 from rotating about the axis 100 when no suitably configured key is inserted into the key slot 134, the plug 130 typically carries a plurality of tumblers (not shown) that are biased to extend radially outwardly into groove formations 136 (see FIGS. 4–7) defined by interior surface portions of the body 120. When a suitably configured key is inserted into the key slot 134, the key engages the tumblers causing them to withdraw from engagement with the groove formations 136 of the body 120, which permits the plug 130 to rotate about the axis 100 when the key is turned.

Because interior body and plug details of cam locks that operate in the manner just described are quite well known in the art and are well understood by those who are skilled in the art, and because internal features of cam locks of this type form no part of the present invention, it is not necessary to include here a discussion of such details in order for effective use to be made of the present invention. Instead, reference is made to patents that disclose a variety of interior body and plug features of cam locks, switch locks, and the like, including U.S. Pat. Nos. 5,964,110, 5,799,520, 5,531,084, 5,485,735, 5,235,832, 5,111,007, 4,689,977, 4,633,689, 4,630,457 and other subject-matter related patents that are owned by The Eastern Company.

Figure 3:
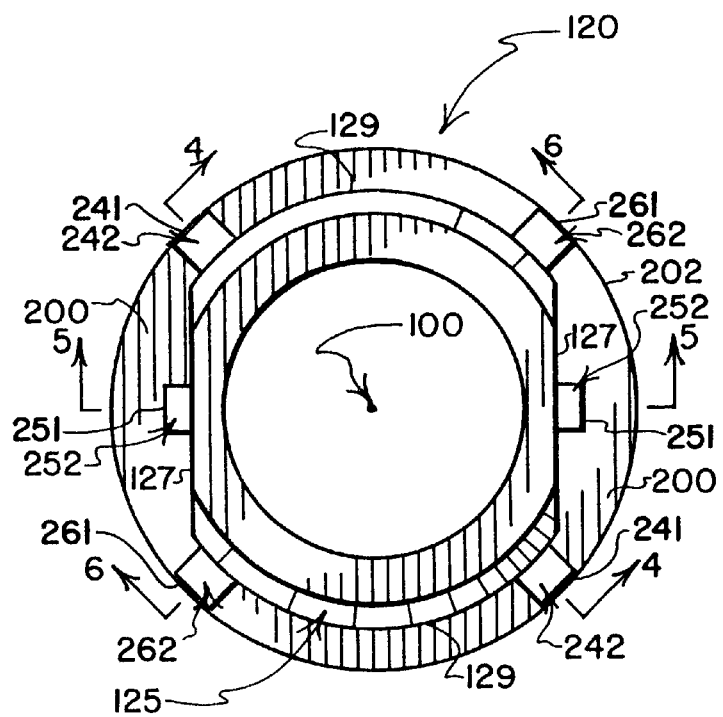
FIG. 3 is a rear view of the body thereof, as seen from a plane indicated by a line 3—3 in FIG. 2.

Referring to FIGS. 1–3, a shoulder 200 is defined by an enlarged diameter bezel 202 provided at a front end region of the body 120. The shoulder 200 extends in a plane that is perpendicular to the axis 100 and faces rearwardly along the axis 100 for engaging a front side of a panel on which the body 120 is to be mounted. Although the shoulder 200 is depicted as being "continuous" in that it extends in an uninterrupted ring-like manner about the axis 100, it will be understood that the shoulder 200 can be interrupted if there is a need for the shoulder 200 to be segmented or otherwise defined only in specific regions spaced about the axis 100. In FIGS. 4, 5, 6 and 7 where the support panels 101, 102, 103, 104 are depicted, it will be seen that, when the body 120 extends through the mounting holes 111, 112, 113, 114 of the support panels 101, 102, 103, 104, respectively, to support the cam lock 110 in its installed position, the shoulder 200 engages the front faces of the panels 101, 102, 103, 104.

Referring again to FIGS. 1–3, an insertion portion 125 of the body 120 extends rearwardly along the axis 100 from the shoulder 200. Projecting from opposite sides of the insertion portion 125 (in directions, that generally extend away from the axis 100) are pairs of arm portions 242, 252, 262. While the arm portions 242, 252, 262 normally extend radially away from the axis 100, the arm portions 242, 252, 262 can be flexed to fold inwardly into recesses 244, 254, 264 that are defined by the insertion portion 125 of tire housing 120.

Referring to FIG. 2, engagement surfaces 240, 250 are defined by arm portions 242, 252, respectively; and, engagement surfaces 260, 270 are defined by sizable tooth-like formations of arm portions 262. The engagement surfaces 240, 250, 260, 270 face forwardly along the axis 100 toward the shoulder 200 and are configured to engage the rear faces of support panels of a variety of thicknesses when the front faces thereof are engaged by the shoulder 200. In FIGS. 4, 5, 6 and 7 where the body 120 is shown in its installed position (i.e., the body 120 is shown mounted on the panels 101, 102, 103, 104 which are of differing thickness), it will be seen that the engagement surfaces 240, 250, 260, 270 face toward and engage rear faces of the panels 101, 102, 103, 104, respectively.

Figure 4:
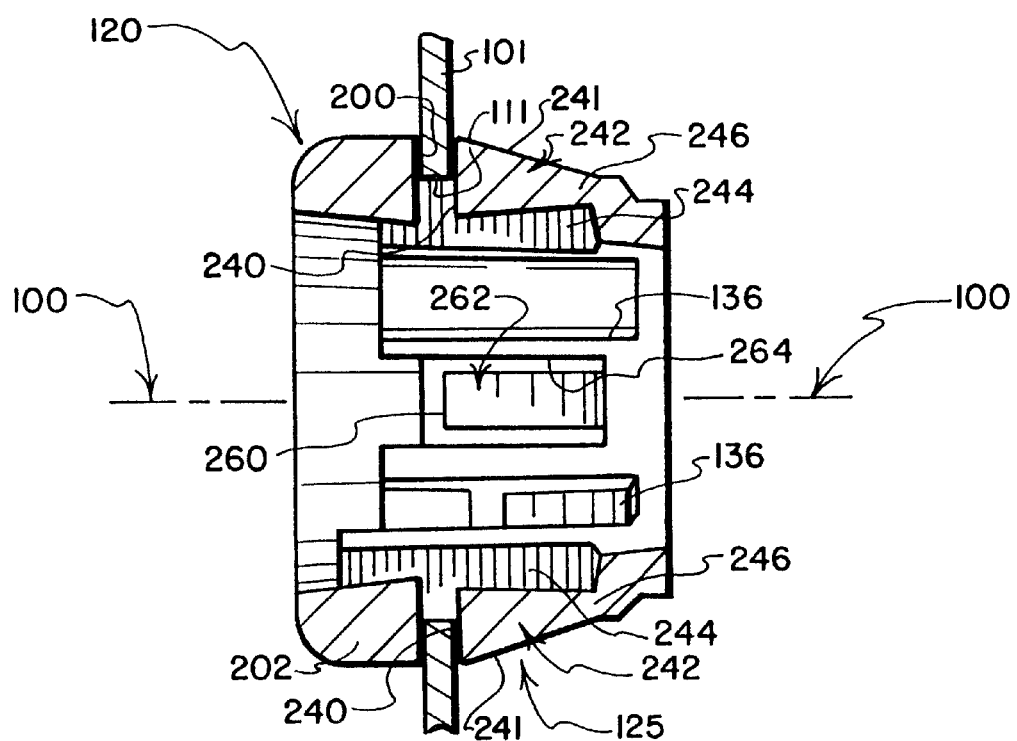
FIG. 4 is a sectional view seen from a plane indicated by a line 4—4 in FIG. 3, with the body shown installed in a hole formed through a support panel of a relatively thin first thickness.
Figure 5:
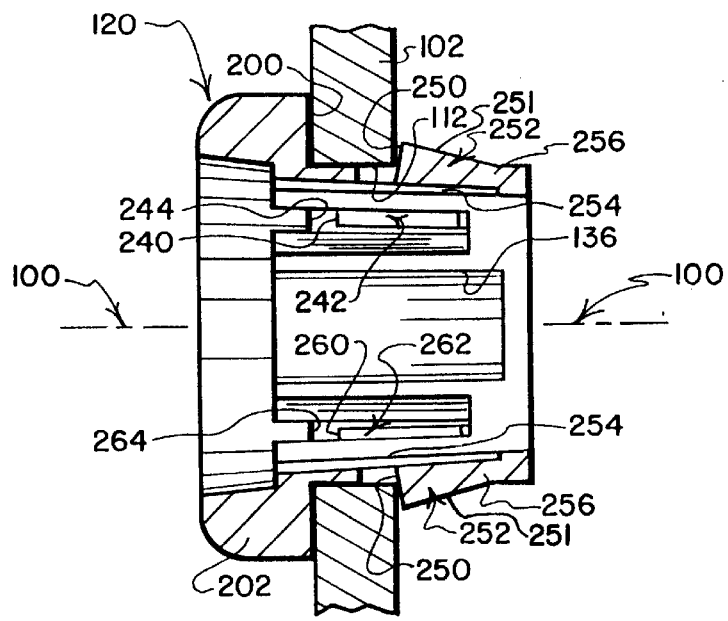
FIG. 5 is a sectional view seen from a plane indicated by a line 5—5 in FIG. 3, with the body shown installed in a hole formed through a support panel of a second thickness that is significantly greater than the first thickness.
Figure 6:
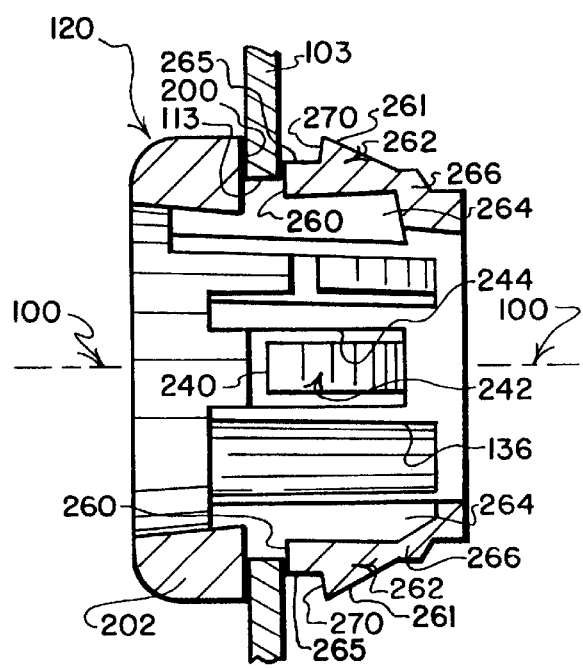
FIG. 6 is a sectional view seen from a plane indicated by a line 6—6 in FIG. 3, with the body shown installed in a hole formed through a support panel of a third thickness which is greater than the first thickness and less than the second thickness; and, FIG. 7 is a sectional view showing the same features that are depicted in FIG. 6 except that the body is shown installed in a hole formed through a support panel of a fourth thickness which is greater than the first, second and third thicknesses.
Figure 7:
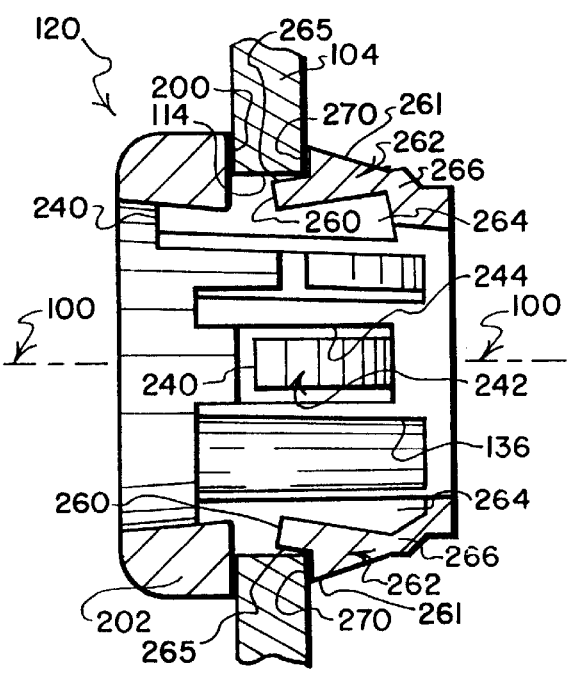

The engagement surfaces 240 are defined by arm portions 242 of the body 120 that extend in a common plane which is indicated in FIG. 3 by the line 4—4; and the recesses 244 extend in this same plane. The engagement surfaces 250 are defined by arm portions 252 of the body 120 that extend in a common plane which is indicated in FIG. 3 by the line 5—5; and the recesses 254 extend in this same plane. The engagement surfaces 260, 270 are defined by arm portions 262 of the body 120 that extend in a common plane which is indicated by the line 6—6; and the recesses 264 extend in this same plane. As is best seen in FIGS. 3 and 4, the arm portions 242 are of substantially identical thickness (FIG. 3); are of substantially identical cross-section (FIG. 4); and have outwardly facing surfaces 241 that extend rearwardly from the engagement surfaces 240 (FIG. 4). As is best seen in FIGS. 3 and 5, the arm portions 252 are of substantially identical thickness (FIG. 3); are of substantially identical cross-section (FIG. 5); and have outwardly facing surfaces 251 that extend rearwardly from the engagement surfaces 250 (FIG. 5). As is best seen in FIGS. 3, 6 and 7, the arm portions 262 are of substantially identical thickness (FIG. 3); are of substantially identical cross-section (FIGS. 6 and 7); have outwardly facing surfaces 261 that extend rearwardly from the engagement surfaces 260 (FIGS. 6 and 7); and have outwardly facing surfaces 265 that extend rearwardly from the engagement surfaces 270 to the engagement surfaces 260.

Referring to FIG. 3, it will be seen that the planes identified by the lines 4—4 and 6—6 intersect the insertion portion 125 of the body 120 near where opposed flat side surfaces 127 intersect with opposed curved surfaces 129 of the insertion portion 125 of the body 120. In essence, the planes identified by the lines 4—4 and 6—6 form an "X" that intersect at the center axis 100. And, the plane identified by the line 5—5 extends perpendicular to the opposed flat surfaces 127; and, this same plane intersects the planes identified by the lines 4—4 and 6—6 at the center axis 100.

Referring to FIG. 4, the arm portions 242 are connected by a thin cross-section of material 246 to the insertion portion 125 of the body 120. Referring to FIG. 5, the arm portions 252 are connected by a thin cross-section of material 256 to the insertion portion 125 of the body 120. Referring to FIGS. 6 and 7, the arm portions 262 are connected by a thin cross-section of material 266 to the insertion portion 125 of the body 120. The thin cross-sections of material 246, 256, 266 are sufficiently thin that they can be flexed to permit the arm portions 242, 252, 262 to fold into the recesses 244, 254, 264 to the extent needed to permit the insertion portion 125 of the body 120 to pass through the holes 111, 112, 113, 114 of the support panels 101, 102, 103, 104 during installation of the body 120 on the panels 101, 102, 103, 104.

If the body 120 is formed as by molding it from plastics material, the mold (not shown) is configured to form the arm portions 242, 252, 262 in their outwardly extended positions rather than folded inwardly into the recesses 244, 254, 264 so that the plastics material in the vicinities of the thin cross-sections 246, 256, 266 will take on the characteristic of "memory" that will cause the arm portions 242, 252, 262 to be biased toward their outwardly extended positions when the arm portions 242, 252, 262 are pressed inwardly into the recesses 244, 254, 264 as during insertion of the insertable body portion 125 through any of the mounting holes 111, 112, 113, 114 of the panels 101, 102, 103, 104.

The support panel 102 depicted in FIG. 5 is the thickest of the four panels 101, 102, 103, 1.04. The support panel 104 depicted in FIG. 7 is second-to-the-thickest of the four panels 101, 102, 103, 104. The support panel 103 depicted in FIG. 6 is the third-thickest (or next-to-the-thinnest) of the four panels 101, 102, 103, 104. The support panel 101 is the thinnest of the four panels 101, 102, 103, 104. By way of example, these panel thicknesses can include four thicknesses selected from among 1.03 mm, 1.16 mm, 2.80 mm, 3.17 mm, 3.30 mm and 3.55 mm which comprise thicknesses that often are used in plastic guards for thermostats. If the arm portions 242 and 252 are provided with tooth formations (in the manner that the arm portions 262 are provided with tooth formations that define the engagement surfaces 260, 270, respectively), all six of these common panel thicknesses can be accommodated by a single snap-in mount.

If the insertable body portion 125 is inserted through the mounting hole 112 of the support panel 102 (i.e., the thickest of the support panels 101, 102, 103, 104) to the installed position depicted in FIG. 5, only the arm portions 252 will "snap out" (i.e., move radially outwardly) when the body 120 reaches its installed position. This is because the engagement surfaces 240, 260, 270 are located closer to the shoulder 200 than are the engagement surfaces 250, and are therefore remain confined within the hole 112 of the thickest support panel 102 when the arm portions 252 snap out to bring the engagement surfaces 250 into engagement with the rear face of the support panel 102. Although the arm portions 242, 262 do not "snap out" to assist the arm portions 252 in performing a "retaining function" of preventing removal of the cam lock body 120 from the hole 112, the fact that the arm portions 242, 262 are biased radially outwardly causes the outwardly facing surfaces 241, 261 of the arm portions 242, 262 to press outwardly to engage the material of the panel 102 that defines the hole 112 at four locations spaced circumferentially about the body 120 (with none of these locations residing within the plane indicated by the line 5—5 in FIG. 3 i.e., the plane within which the arm portions 252 move when they "snap outwardly" to the position shown in FIG. 5 where the arm portions 252 perform their retaining function) to perform what can be referred to as an "anti-rattle" function of eliminating "looseness" of the cam lock body 120 in the hole 112 and of minimizing the possibility that the body 120 will move relative to the panel 102 even under the influence of vibration. The engagement surfaces 250 that cooperate with the shoulder 200 to engage opposite sides of the panel 102 to perform the retaining function of the arm portions 252 are the engagement surfaces that are defined by the arm portions 252 which are stationed along the opposed flat side surfaces 127 of the insertion portion 125 of the body 120.

If the insertable body portion 125 is inserted through the mounting hole 114 of the support panel 104 (i.e., the next-to-the-thickest of the support panels 101, 102, 103, 104) to the installed position depicted in FIG. 7, the arm portions 262 will "snap out" (after the arm portions 252 have "snapped out") during the insertion of the insertion portion 125 of the body 120 through the hole 114 to move the body 120 to its installed position where the engagement surfaces 270 engage the rear face of the support panel 104. However, as is seen in FIG. 7, the arm portions 242 will remain within the hole 114 and their outwardly-biased nature will cause their outwardly facing surfaces 241 to press radially outwardly (in the plane indicated by the line 4—4 in FIG. 3) against the material that defines the hole 114 to aid the arm portions 262 (which also are biased radially outwardly such that their outwardly facing surfaces 265 are caused to engage, as depicted in FIG. 7, and thus to press radially outwardly against the material of the panel 104 that defines the hole 114—with the engagement of the arm portions 262 with the material that defines the hole 114 taking place within the plane indicated by the line 6—6 in FIG. 3—a plane that is distinctly different from the plane 4—4 within which the outwardly facing surfaces 241 of the arm portions 242 engage the material of the panel 104 that defines the hole 114) in performing the "anti-rattle" function of minimizing looseness of the body 120 in the hole 114 and of preventing unwanted movement of the body 120 relative to the support panel 104 (thus, the arm portions 242 and 262 which extend in separate radially extending planes perform an anti-rattle function while the arm portions 262 which have snapped radially outwardly to bring their engagement surfaces 270 into engagement with the rear face of the panel 104 also perform a retaining function to ensure that the lock body 120 is held securely in place in the hole 114 of the panel 104).

If the insertable body portion 125 is inserted through the mounting hole 113 of the next-to-the-thinnest panel 103 to the installed position shown in FIG. 6, the arm portions 262 will "snap out" twice after the arm portions 252 have "snapped out" during the insertion of the insertion portion 125 of the body 120 through the hole 113 to move the body 120 to its installed position where the engagement surfaces 260 engage the rear face of the support panel 103. However, as is seen in FIG. 6, the arm portions 242 will remain within the hole 113 and their outwardly-biased nature will cause their outwardly facing surfaces 241 to press radially outwardly (acting in the radially extending plane indicated by the line 4—4 in FIG. 3) against the material that defines the hole 113) while the the arm portions 262 function in the separate and distinct plane indicated by the line 6—6 in FIG. 3 to prevent unwanted movement of the body 120 relative to the support panel 103.

If the insertable body portion 125 is inserted through tile mounting hole 111 of the thinnest panel 101 to the installed position shown in FIG. 4, the arm portions 242 will "snap out" after the arm portions 252 have "snapped out" once and after the arm portions 262 have "snapped out" twice during the insertion of the insertion portion 125 of the body 120 through the hole 111 of the thinnest panel 101 to its installed position where the engagement surfaces 240 engage tile rear face of the support panel 101.

While the body 120 is not intended to be easily removed from panels on which it is installed, pressing all of the arm portions 242, 252, 262 radially inwardly into their recesses 244, 254, 264 can be accomplished with ease by pushing a ring-like member (not shown) over the insertion portion 125—a ring-like member having an inner diameter that fits closely enough about the outer diameter of the insertion portion 125 to compress the arm portions 242, 252, 262 sufficiently to permit them to pass back through one of the holes 111, 112, 113, 114.

Although the invention has been described in its preferred form with a certain degree of particularity, it is understood that the present disclosure of the preferred form has been made only by way of example, and that numerous changes in the details of construction and the arrangement of elements can be made without departing from the spirit and scope of the invention as claimed.

What is claimed is:

1. A snap-in mount for a device adapting the device to be mounted from one side of and through a hole formed in a support panel to secure the device to the panel with a shoulder of the device facing in one direction toward the panel for engaging the one side of the panel, with a plurality of engagement surfaces also being defined by the device that face in an opposite direction for engaging an opposite side of the panel when the shoulder engages the one side of the panel, with distances between the engagement surfaces and a plane in which the shoulder engages the one side of the panel differing sufficiently to enable the device to be mounted on panels of distinctly different thicknesses, comprising:

a) a body of the device having an insertion portion of the body configured to be positioned and moved along an axis of the hole so as to be inserted through the hole from the one side of the panel to an installed position where the shoulder of the device faces toward and engages the one side of the panel;

b) a first pair of arms pivotally connected to the body, a second pair of arms pivotally connected to the body, and a third pair of arms pivotally connected to the body; with the arms of the first pair each having a first arm portion that is movable in a first plane that extends radially with respect to the axis inwardly toward the axis and outwardly away from the axis when the body is positioned along the axis; with the arms of the second pair each having a second arm portion that is movable in a second plane that extends radially with respect to the axis inwardly toward the axis and outwardly away from the axis when the body is positioned along the axis; with the arms of the third pair each having a third arm portion that is movable in a third plane that extends radially with respect to the axis inwardly toward the axis and outwardly away from the axis when the body is positioned along the axis; with each of the first, second and third arm portions being configured, when moved inwardly toward the axis, to pass at least part way through the hole when the insertion portion of the body is moved along the axis to the installed position; with each of the first arm portions being configured, when pivotally moved outwardly away from the axis, to define a first engagement surface that faces in the opposite direction toward said plane; with each of the second arm portions being configured, when pivotally moved outwardly away from the axis, to define a second engagement surface that faces in the opposite direction toward said plane; with each of the third arm portions being configured when pivotally moved outwardly away from the axis, to define a third and fourth engagement surfaces that face in the opposite direction toward said plane; with the first engagement surfaces being spaced a substantially equal first distance from said plane; with the second engagement surfaces being spaced a substantially equal second distance from said plane that differs from said first distance; with the third engagement surfaces being spaced a substantially equal third distance from said plane that differs from said first and second distances; with the fourth engagement surfaces being spaced a substantially equal fourth distance from said plane that differs from the first, second and third distances; and, c) means for connecting the first, second and third arms to the body, for causing each of the arm portions to normally extend outwardly from the insertion portion of the body to positions located away from the axis, and for causing each of the arm portions to be biased toward said positions when pressed inwardly toward the axis to permit the insertion portion of the body to pass through the hole, to thereby cause the arm portions of at least one of the first, second and third pairs of arms to pivotally move outwardly away from the axis once the insertion portion has been moved to the installed position to cause the engagement surfaces thereof to face in said opposite direction toward said opposite side of the panel so that the one and opposite sides of the panel are engaged by the shoulder and by selected ones of the engagement surfaces of such ones of the arm portions as have pivotally moved outwardly away from the axis after passing at least part way through the hole; with such ones of the arm portions as have not pivotally moved outwardly away from the axis when the insertion portion has been moved to the installed position being configured to press against the material of the panel that defines the hole to minimize looseness of the insertion portion of the body within the hole and to minimize movement of the body relative to the panel in the presence of vibration;

d) whereby the device can be securely mounted on panels of differing thicknesses that each substantially equal one of the differing first, second, third and fourth distances.

2. The snap-in mount of claim 1 wherein the hole formed through the panel is defined by a surface that extends between the one side and the opposite side of the panel, and the first, second and third arm portions are configured and connected to the body to engage different segments of said surface so as to be pressed inwardly toward the axis as the insertion portion of the body passes through the hole during insertion.

3. The snap-in mount of claim 1 wherein the first, second and third arms are formed integrally with the body, and the means for connecting the first, second and third arms to the body includes thin cross-sections of material that can be flexed to enable each of the arm portions to move relative to the insertion portion of the body toward and away from the axis.

4. The snap-in mount of claim 3 wherein the body is formed from plastics material having memory, and the biasing of the arm portions toward said positions results at least in part from the memory of the plastics material.

5. The snap-in mount of claim 3 wherein the body defines recesses into which the arm portions extend when the arm portions are pressed inwardly toward the axis to permit the insertion portion to pass through the hole.

6. The snap-in mount of claim 5 wherein each of the recesses receives a separate one of the arms when the arm portions are pressed inwardly toward the axis.

7. The snap-in mount of claim 5 wherein the insertion portion of the body has a cross-section that is defined at least in part by a first curved surface, and at least a first one of the recesses opens outwardly through the first curved surface.

8. The snap-in mount of claim 7 wherein the cross-section also is defined at least in part by a second curved surface located on an opposite side of the cross-section from the first curved surface, and at least a second one of the recesses opens outwardly through the second curved surface.

9. The snap-in mount of claim 5 wherein the insertion portion of the body has a cross-section that is defined at least in part by a first flat surface, and at least a first one of the recesses opens outwardly through the first flat surface.

10. The snap-in mount of claim 9 wherein the cross-section also is defined at least in part by a second flat surface located on an opposite side of the cross-section from the first flat surface, and at least a second one of the recesses opens outwardly through the second flat surface.

11. The snap-in mount of claim 5 wherein the insertion portion of the body has a cross-section that is defined at least in part by a first flat surface and at least in part by a first curved surface that joins with the first flat surface at a first juncture, and at least a first one of the recesses is located near the first juncture.

12. The snap-in mount of claim 11 wherein the cross-section also is defined at least in part by a second flat surface and at least in part by a second curved surface that joins with the second flat surface at a second juncture, and at least a second one of the recesses is located near the second juncture.

13. The snap-in mount of claim 12 wherein the first and second flat surfaces are located on opposite sides of the cross-section from each other, the first and second curved surfaces are located on opposite sides of the cross-section from each other, the first and second junctures are located on opposite sides of the cross-section from each other, and the first and second ones of the recesses are located on opposite sides of the cross-section from each other.

14. The snap-in mount of claim 13 wherein additional ones of the recesses open through the first and second flat surfaces at locations on opposite sides of the cross-section from each other.

15. The snap-in mount of claim 14 wherein the first flat surface joins the second curved surface at a third juncture, the second flat surface joins the first curved surface at a fourth juncture, and other ones of the recesses are located near the third and fourth junctures on opposite sides of the cross-section from each other.

16. A cam lock having a body 1) that extends along an imaginary central axis, 2) that defines a shoulder which faces in one direction along the axis and extends in a shoulder plane that perpendicularly intersects the axis for engaging one side of a panel on which the cam lock is to be mounted, 3) that has a generally cylindrical insertion portion of the body that extends in said direction along the axis away from the shoulder and that is configured to be inserted into and to pass at least partially through a mounting hole formed through the panel, and 4) that carries arms arranged in first, second and third opposed pairs with the arms of each pair being located on opposite sides of the axis with the arms of each pair being spaced circumferentially about the body from the arms of the other pairs, wherein the arms each define an arm portion 1) that travels at least part of the way through the mounting hole when the insertion portion of the body is inserted into the mounting hole to an installed position of the body wherein the shoulder engages the one side of the panel, 2) that is pivotally movable radially inwardly and outwardly relative to the central axis, and 3) that is biased radially outwardly relative to the central axis toward extended positions, with the arm portions of each pair of arms being operative when in the extended positions thereof to define engagement surfaces that face in an opposite direction along the axis toward the shoulder plane for engaging an opposite side of the panel, and with the engagement surfaces of the first pair of arms extending in a first plane that perpendicularly intersects the axis at a first distance from the shoulder plane 1) that differs from a second distance at which a second plane in which the engagement surfaces of the second pair of arms perpendicularly intersects the axis, 2) that differs from a third distance at which a third plane in which first ones of the engagement surfaces of the third pair of arms perpendicularly intersects the axis, 3) that differs from a fourth distance at which a fourth plane in which second ones of the engagement surfaces defined by the third pair of arms perpendicularly intersects the axis, wherein the second, third and fourth distances also differ one from another, to thereby enable the engagement surfaces of the first, second and third pairs of arms to cooperate with the shoulder to grip panels of four differing thicknesses when the body is in installed positions in mounting holes defined by said panels of four differing thicknesses, wherein the hole formed through the panel is defined by a surface that extends between the one side and the opposite side of the panel, and the arm portions are configured and connected to the body to engage different segments of said surface so as to be pressed inwardly toward the axis as the insertion portion of the body passes through the hole during insertion, and with such ones of the arms as have not pivotally moved radially outwardly away from the axis when the insertion portion has been moved to the installed position being configured to press against the material of the panel that defines the hole to minimize looseness of the insertion portion of the body within the hole and to minimize movement of the body relative to the panel in the presence of vibration.

17. The cam lock of claim 16 wherein the arms of each of the first, second and third pairs of arms all are formed integrally with the body, and the means for connecting the arms to the body includes thin cross-sections of material that can be flexed to enable the arm portions to move relative to the insertion portion of the body toward and away from the axis.

18. The cam lock of claim 17 wherein the body is formed from plastics material having memory, and the biasing of the arm portions toward the extended positions results at least in part from the memory of the plastics material.

19. The cam lock of claim 17 wherein the body defines recesses into which the arm portions extend when the arm portions are pressed inwardly toward the axis to permit the insertion portion to pass through the hole.

20. The cam lock of claim 19 wherein at least two of the recesses are located on opposite sides of the insertion portion.

21. The cam lock of claim 19 wherein the insertion portion of the body has a cross-section that is defined at least in part by a first curved surface, and at least a first one of the recesses opens outwardly through the first curved surface.

22. The cam lock of claim 21 wherein the cross-section also is defined at least in part by a second curved surface located on an opposite side of the cross-section from the first curved surface, and at least a second one of the recesses opens outwardly through the second curved surface.

23. The cam lock of claim 19 wherein the insertion portion of the body has a cross-section that is defined at least in part by a first flat surface, and at least a first one of the recesses opens outwardly through the first flat surface.

24. The cam lock of claim 23 wherein the cross-section also is defined at least in part by a second flat surface located on an opposite side of the cross-section from the first flat surface, and at least a second one of the recesses opens outwardly through the second flat surface.

25. The cam lock of claim 19 wherein the insertion portion of the body has a cross-section that is defined at least in part by a first flat surface and at least in part by a first curved surface that joins with the first flat surface at a first juncture, and at least a first one of the recesses is located near the first juncture.

26. The cam lock of claim 25 wherein the cross-section also is defined at least in part by a second flat surface and at least in part by a second curved surface that joins with the second flat surface at a second juncture, and at least a second one of the recesses is located near the second juncture.

27. The cam lock of claim 26 wherein the first and second flat surfaces are located on opposite sides of the cross-section from each other, the first and second curved surfaces are located on opposite sides of the cross-section from each other, the first and second junctures are located on opposite sides of the cross-section from each other, and the first and second ones of the recesses are located on opposite sides of the cross-section from each other.

28. The cam lock of claim 27 wherein additional ones of the recesses open through the first and second flat surfaces at locations on opposite sides of the cross-section from each other.

29. The cam lock of claim 28 wherein the first flat surface joins the second curved surface at a third juncture, the second flat surface joins the first curved surface at a fourth juncture, and other ones of the recesses are located near the third and fourth junctures on opposite sides of the cross-section from each other.

30. A snap-in mount for a device having a body that defines a shoulder for facing toward and engaging one side of a support panel when an insertion portion of the body is inserted along an axis of a hole formed through the support panel to an inserted position, and having three pairs of snap-out elements pivotally connected to the body, with each of the pairs of snap-out elements being biased to pivot in a separate plane that extends radially with respect to said axis outwardly away from the axis after passing at least part way through the hole when the insertion portion of the body is inserted along the axis to the inserted position to define at least four pairs of engagement surfaces that face toward the opposite side of the support panel, wherein the pairs of engagement surfaces are located at different distances from the shoulder for cooperating with the shoulder for engaging the one and opposite sides of support panels of at least four different thicknesses that substantially equal the different distances, and wherein the snap-out elements are configured so that such ones of the snap-out elements as have not pivoted radially outwardly away from the axis when the insertion portion has been moved to the installed position are configured to press against the material of the panel that defines the hole to minimize looseness of the insertion portion of the body within the hole and to minimize movement of the body relative to the panel in the presence of vibration.

\* \* \* \* \*